(No Model.) 2 Sheets—Sheet 1.
C. I. & E. WILLIAMSON.
LAND ROLLER.
No. 511,389. Patented Dec. 26, 1893.
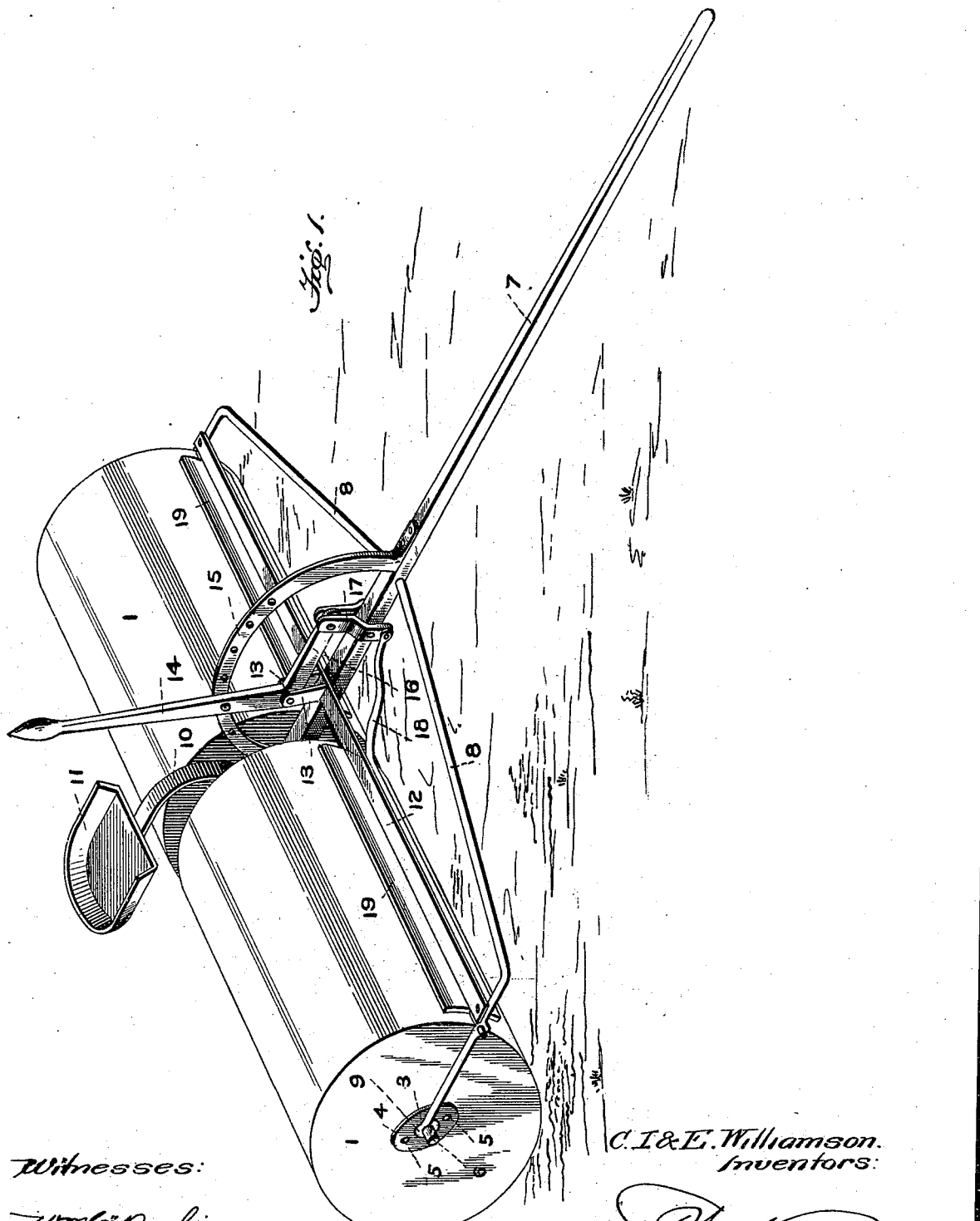

(No Model.) 2 Sheets—Sheet 2.
C. I. & E. WILLIAMSON.
LAND ROLLER.
No. 511,389. Patented Dec. 26, 1893.
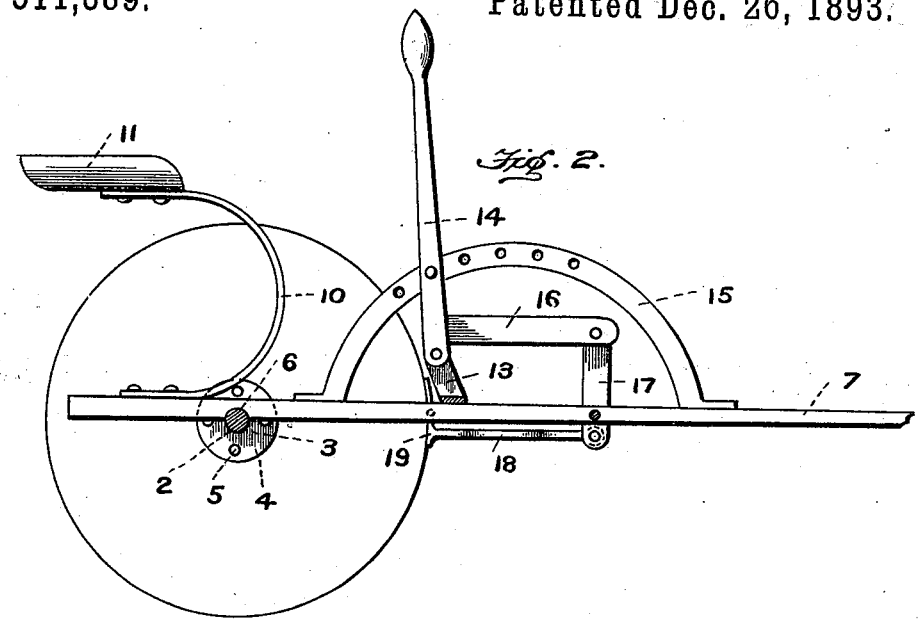
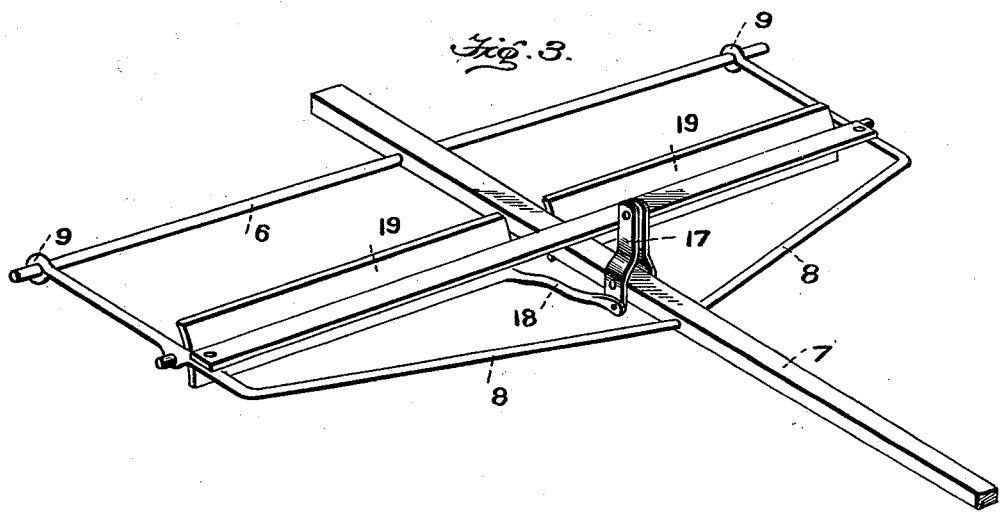
Witnesses:
Wm. C. Dashiell
May E. Moore
C. I. & E. Williamson.
Inventors:
By Wm. J. Moore,
Att'y.

UNITED STATES PATENT OFFICE.

CHARLES I. WILLIAMSON AND ELWOOD WILLIAMSON, OF UNION CITY, INDIANA.

LAND-ROLLER.

SPECIFICATION forming part of Letters Patent No. 511,389, dated December 26, 1893.

Application filed March 18, 1893. Serial No. 466,683. (No model.)

*To all whom it may concern:*

Be it known that we, CHARLES I. WILLIAMSON and ELWOOD WILLIAMSON, citizens of the United States, residing at Union City, in the county of Randolph and State of Indiana, have invented certain new and useful Improvements in Land-Rollers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in land rollers, adapted for rolling land for farming, for roads or for any desired purpose and the object of our invention is the provision of a land roller which will be superior in points of simplicity and durability of construction, general efficiency and which can be produced at a comparatively low price thus rendering the invention practical and useful.

The invention consists of a land roller embodying novel features of construction and combination of parts for service substantially as disclosed herein.

In order that the details of construction and the operation and advantages of our invention may be readily understood we have illustrated in the accompanying drawings a land roller constructed in accordance with our improvements.

Figure 1 represents a perspective view of our improved land roller. Fig. 2 represents a transverse sectional view thereof. Fig. 3 represents a perspective view of the devices detached from the rollers to clearly illustrate their construction.

Referring by numerals to the drawings in which similar numerals denote corresponding parts in the several views thereof, the numerals 1 1 designate a pair of rollers made of wood or of metal and of the required and necessary size, provided with a central bore or passage 2, in the ends of which are placed the bushings or bearings 3 having the flanged edges 4 to receive bolts or fastenings 5, for securing the bushings in place and in said bushings is mounted the axle 6, the outer ends whereof project a short distance beyond the rollers and between the rollers is a space to allow the insertion of the tongue 7. The inner end of the tongue is secured or mounted upon the axle and to the tongue are secured the frame bars 8, having the free ends formed with loops or eyes 9, which form bearings for the axle and on the tongue between the rollers is supported the spring 10, carrying the driver's seat 11. From this construction it is evident that the rollers are mounted upon the axle and revolve thereon, and the driver is seated above the rollers and in a convenient position to manipulate the rollers and we provide the following mechanism to clean the rollers:

On the bars 8 is mounted the cross piece 12, having the ears or uprights 13 in which is mounted the lever 14 adjustable on the rack or segment plate 15, and having the arm 16, connected to the upper ends of the pivoted links 17, the lower ends whereof are connected to the arms 18, on the scrapers 19, having the ends journaled in the frame bars and tongue as clearly shown. From this construction it will be seen that when the lever is moved outward the connections cause the scrapers to bear against the face of the rollers and remove the mud or dirt from the surface thereof and thereby keep the rollers always clean and smooth. It will also be noted that the lever is adjustable and consequently the scrapers so that they may be brought against or close to the rollers as desired and wear on the edge of the scrapers can be taken up as will be understood.

It is evident that we provide a land roller which is durable, inexpensive and efficient and which will commend itself to all who desire a practical improvement.

We claim—

1. A land roller consisting of the twin rollers, having the metal bushings the axle mounted therein, the tongue secured to the axle, the bars connected to the tongue and axle, the cross bar having the ears or uprights, the lever mounted in the uprights, the arm connected to the lever, the links having their upper ends connected to said arm, the scrapers pivoted in the tongue and frame and having the arms at their inner ends connected to the lower ends of the links and operated by the lever.

2. A land roller consisting of the twin rollers, the axle mounted therein, the tongue carrying the seat secured on the axle between the rollers, the frame secured to the tongue and axle, the cross piece having the lugs or ears, the lever pivoted in the ears and having the arm, the links pivoted on the tongue and connected at their upper ends to the arm, the pivoted scrapers connected to the lower ends of the links and operated by the lever and the segmental plate on which the lever is adjusted.

In testimony whereof we affix our signatures in presence of two witnesses.

CHARLES I. WILLIAMSON.
ELWOOD WILLIAMSON.

Witnesses:
S. M. BRISCOE,
GEORGE WELLS SMITH.